United States Patent [19]

Dasgupta

[11] Patent Number: 5,423,904
[45] Date of Patent: Jun. 13, 1995

[54] EXHAUST GAS FILTER

[76] Inventor: Sankar Dasgupta, c/o Electrofuels Manufcturing Co. 9 Hanna Ave., Toronto, Ontario M6K 1W8, Canada

[21] Appl. No.: 338,731

[22] Filed: Nov. 9, 1994

Related U.S. Application Data

[63] Continuation of Ser. No. 69,113, May 28, 1993, abandoned.

[51] Int. Cl.⁶ .............................................. B01D 29/62
[52] U.S. Cl. .................................. 96/146; 55/282; 55/301; 55/385.3; 55/523; 55/DIG. 30; 60/311; 60/320; 96/153
[58] Field of Search ...................... 96/146, 153; 55/523, 55/267, 301, 282, 283, 385.3, DIG. 30; 95/278, 148, 283; 219/201, 205; 422/174, 199; 60/300, 303, 311, 320

[56] References Cited

U.S. PATENT DOCUMENTS

| | | | |
|---|---|---|---|
| 4,319,896 | 3/1982 | Sweeney | 60/311 X |
| 4,427,418 | 1/1984 | Kogiso et al. | 55/523 X |
| 4,535,589 | 8/1985 | Yoshida et al. | 55/DIG. 30 |
| 4,567,725 | 2/1986 | Shinzawa et al. | 60/311 X |
| 4,662,911 | 5/1987 | Hirayama et al. | 55/523 X |
| 4,719,751 | 1/1988 | Kume et al. | 60/285 |
| 4,744,216 | 5/1988 | Durga et al. | 55/466 X |
| 4,833,883 | 5/1989 | Oda et al. | 55/523 X |
| 4,881,959 | 11/1989 | Kono et al. | 55/523 X |
| 4,903,617 | 2/1990 | Weber et al. | 55/523 X |
| 5,063,029 | 11/1991 | Mizuno et al. | 60/300 X |
| 5,140,813 | 8/1992 | Whittenberger | 422/174 X |
| 5,171,337 | 12/1992 | Pollock | 55/523 X |
| 5,202,548 | 4/1993 | Kondo et al. | 219/205 X |
| 5,229,079 | 7/1993 | Harada et al. | 60/300 X |
| 5,234,668 | 8/1993 | Harada et al. | 60/300 X |
| 5,245,825 | 9/1993 | Ohhashi et al. | 60/300 |
| 5,254,840 | 10/1993 | Thompson | 60/300 X |
| 5,259,190 | 11/1993 | Bagley et al. | 60/300 |
| 5,266,278 | 11/1993 | Harada et al. | 60/300 X |

Primary Examiner—Richard L. Chiesa

[57] ABSTRACT

An electrically conducting ceramic composition is described which can be utilized in an exhaust gas filter. The ceramic composition is compacted into discs or ceramic plates, are subsequently fired or sintered and then equipped with electrodes. Electrode leads are attached to the sintered filter discs or plates bearing electrodes which are subsequently connected to a power source. The ceramic filter discs or plates are supported and enclosed in a metallic housing. In another embodiment an insulator ring is placed between the housing and the ceramic filter plate. The housing enclosing the ceramic filter or filters, and equipped with electrodes and appropriate leads, is incorporated in the exhaust system of an internal combustion engine. The ceramic filter is used for trapping combustible carbon particles carried by the exhaust gas emanating from the engine. The carbon particles collected by the filter can be eliminated by heat generated electrically by means of an electrical current being passed through the filter between the electrodes when so desired.

14 Claims, 2 Drawing Sheets

EXHAUST GAS FILTER

This application is a continuation of Ser. No. 08/069,113, filed; May 28, 1993, now abandoned.

FIELD OF THE INVENTION

This invention is related to the field of gas filters, more particularly to the field of exhaust gas filters.

The operation of an internal combustion engine is accompanied by the generation of exhaust gases. The exhaust gases emanating from an internal combustion engine contain unburnt carbon particles ranging in size from the submicroscopic to a few microns. The emission to the atmosphere of such unburnt carbon particles are considered environmentally offensive. A particular type of internal combustion engine, the diesel engine is very widely used by the transportation industry. Due to its construction and the nature of fuel the diesel engine utilizes, the exhaust gases generated by diesel engines tend to be even more abundant in unburnt carbon particles. It is therefor an environmental requirement to provide means for eliminating carbon particles from exhaust gases, before such gases enter the surrounding atmosphere. The unburnt carbon particles are usually removed from the exhaust gases by incorporating some form of a filtering device in the exhaust gas handling system of an internal combustion engine, such as a diesel engine.

There are many different materials which are commonly used for filtering exhaust gases, such as for example, glass or metallic wool, loose ceramic particles, and so forth. Other types of filtering devices utilize discs, cylinders or similar conveniently shaped bodies which are porous and high temperature resistant as well, to allow the passage of exhaust gases while simultaneously trapping the unburnt carbon particles carried by the gases.

The pores and cavities of the above discussed filtering devices, however, are likely to be blocked during use by the retained unburnt carbon particles, resulting in increased exhaust gas back pressure and in a drop in the efficiency of the engine. As the build-up of carbon particles continues, the magnitude of the exhaust gas back pressure increases further, while the efficiency of the engine is reduced even more. The build-up of the unburnt carbon particles and similar carbonaceous matter necessitates frequent change of filters utilized in filtering devices. Thus unburnt carbon particles carried by exhaust gases affect the operating cost of an internal combustion engine in two ways: in reducing the efficiency of the engine and in the expense of having to replace the filter. One possible way of overcoming such difficulties lies in regenerating the filter clogged by carbon particles. In other words, the operation of the filter may be revitalized by periodically burning off the carbon particles trapped by the filter elements incorporated in the filtering devices of the internal combustion engine.

One of the more commonly used methods of regenerating the filter element incorporated in a filtering device is increasing the temperature of the filter element in order to combust the carbon particles trapped within the filter element. An example of such a method is described in U.S. Pat. No. 4,319,896 issued to W. M. Sweeney on Mar. 16 1982, which utilizes an electric resistance heater coil embedded in a ceramic filter element. The operation of the heater is triggered by pressure and temperature sensing devices.

Another approach in regenerating the filter by combusting the carbon particles trapped within it, may be found in a conventional filtering device wherein the filter is made up of two portions. The first portion of the filter of this type has relatively large pores and embeds an electric heater or heaters. The second, usually larger portion is designed to remove the bulk of the unburnt carbon particles from the exhaust gas. The exhaust gases passing through the first portion are thereby heated during the regeneration step to eliminate by combustion the carbon trapped by the second portion. Filtering devices of the above design are described, for example, in U.S. Pat. No. 4,427,418 issued to Takeshi Kogiso et al. on Jan. 24 1984 and in U.S. Pat. No. 4,662,911 issued to Tsukasa Hirayama et al. on May 5 1987.

The exhaust gases often contain corrosive components which may have adverse effect on the embedded heater element incorporated in a conventional filtering device of this type. The metallic heating components or wires comprised in such heaters may become corroded, oxidized or otherwise damaged when exposed to the exhaust gases, resulting in malfunction of the heater and breakdown in the regeneration of the filter element of the device.

U.S. Pat. No. 4,535,589, issued to Hitoshi Yoshida et al. on Aug. 20 1985, utilizes electrically conducting ceramic heater members in the portion of the filter element designed to heat the exhaust gases when the filter element undergoes regeneration. The conductive ceramic heater members have large apertures for facilitating the passage of exhaust gases, and each such member is surrounded and supported by porous ceramic insulators. The electrically conducting ceramic heaters are equipped with metallic electrode connections. In the filtering device described in U.S. Pat. No. 4,535,589 the heater bearing portion is attached to a larger second portion for trapping the offending unburnt carbon particles. It is to be noted that the filtering device of U.S. Pat. No. 4,535,589 also separates the gas heating function from the gas filtering function, similar to the filtering devices described hereinabove.

The conductive ceramic heater members may be made of silicon carbide or lanthanum chromite, according to U.S. Pat. No. 4,535,589. Such conductive ceramic substances have relatively low mechanical strength, and would not withstand mechanical impact and physical vibrations that filtering devices are usually subjected to in the absence of some type of supporting structure. The ceramic heater members of U.S. Pat. No. 4,535,589 are usually encased or supported by alumina and porous cordierite bodies.

The common feature of the filtering devices discussed hereinabove is that in the regenerating cycle of the filter element, the exhaust gases having been heated by some means, pass into a separate portion containing the trapped unburnt carbon particles with the objective of combusting the carbon particles. If the gases entering the filtering portion are allowed to cool or the temperature of the heated gases drops below the combustion temperature of the trapped carbon, the filter regeneration will be incomplete.

By one aspect of the present invention a porous ceramic filter element is provided which allows the passage of exhaust gases while trapping unburnt carbon particles, and which may also act as means to burn the collected carbon particles in the regeneration cycle of the filter element.

By another aspect of the invention a filter element is provided which is made of a porous ceramic substance, which is capable of being heated to high temperatures by means of passage of electrical current, is resistant to oxidation and corrosion and has notable mechanical strength.

By yet another aspect of the invention an exhaust gas filtering device is provided which houses several ceramic filter elements, each filter element being made of a porous electrically resistive ceramic substance and the exhaust gas filtering device is incorporated in the exhaust gas handling system of an internal combustion engine.

SUMMARY OF THE INVENTION

The exhaust gas cleaning device of the present invention comprises at least one porous ceramic filter element having interconnecting channels for allowing exhaust gases to flow therethrough and for trapping particles carried by the exhaust gases. The porous ceramic filter element is a unitary body made of an electrically resistive ceramic substance, comprising an electrically conductive ceramic component dispersed within an electrically insulating ceramic component. The porous ceramic filter element is defined by an internal face, an external face and a perimeter. A pair of electrodes are in contact with the ceramic filter element and each electrode is connectable to an electrical power source for providing an electrical current flowing within said porous ceramic filter element, whereby the temperature of said porous ceramic filter element may be raised above the ambient temperature. A housing adapted to enclose the perimeter of the porous ceramic filter element is further comprised in the exhaust gas cleaning device. The housing has an inlet port which is in communication with an engine combustion chamber, thereby facilitating the passage of exhaust gases from the chamber to the internal face of the porous ceramic filter element. The filtered exhaust gases exit the housing through an outlet port.

One of the electrodes may be connected to the housing and the housing may be grounded.

The housing comprised by the exhaust gas cleaning device may enclose a plurality of porous ceramic filter elements, each of the ceramic filter elements having electrodes, one of each pair of electrodes of each ceramic filter element may be connected to the electrical power source, and the other electrode in contact with each ceramic filter element may be connected to the housing.

Figure 1A:
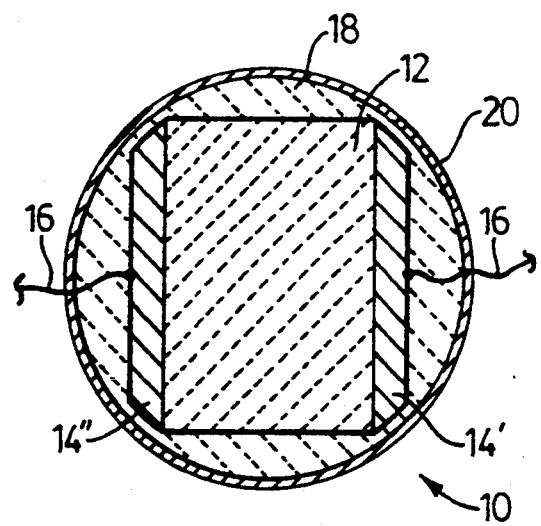
FIGS. 1(a) and 1(b), and 2 are schematic drawings showing different embodiments of the filter element of the present invention.

The preferred embodiment of the invention will now be described hereinbelow and illustrated by working examples.

DETAILED DESCRIPTION OF THE PREFERRED EMBODIMENTS

One of the characteristic features of any gas filter element utilized in a gas cleaning system is that it has two faces, one face is facing the gases entering by a conduit or pipe, and the other face permits the filtered gases to exit towards the atmosphere. Such two faces of a filter element are often parallel, but this is not a requirement for the working of the filter. There is a multiplicity of apertures, tortuous interconnecting channels between the two faces of the filter element, to allow unimpeded passage of the gases through the filter. For the sake of clarity the apertures, channels, pores, openings within the filter element regardless of their size, shape or length within the filter, will be referred to hereinbelow as channels.

The filter element is usually circular in shape such as a disc, but it may have elliptical or rectangular cross-section, or be of any suitable configuration. The shape depends on and is often but not necessarily decided by the cross-section of the conduit or pipe that carries the gases to be filtered from the combustion chamber to the gas filtering device.

The two faces of the filter element may be parallel, or enclose an angle. These will be referred to in the discussion hereinbelow as the faces of a filter plate or a filter element.

The filter plate of the present invention is essentially made of an electrically resistive ceramic substance. The electrically resistive ceramic substance is a mixture of at least two ceramic components. One of the ceramic components in the mixture is a heat and substantially oxidation resistant, stable ceramic insulator. Such ceramic materials are zirconia, hafnia, alumina, silicon nitride, alumina-silicates, or optionally a mixture of the above. The insulator ceramic component may also be mullite, cordierite, and similar conventional ceramic substances which have high strength and insulating properties. It is generally preferred that when zirconia or hafnia is used as an insulator component, it is fully stabilized. Partially stabilized zirconia or hafnia may also be utilized under certain circumstances.

The other ceramic component comprising the electrically resistive mixture of which the ceramic filter plate is made is an electrically conductive ceramic compound. Examples of such ceramic compounds are: titanium nitride, titanium carbonitride, molybdenum disilicide, zirconium and titanium boride or similar ceramic compounds, which are capable of conducting electricity, are stable at high temperature and are relatively resistant to oxidation and corrosion.

It is desirable that the ceramic substance for obtaining the ceramic filter plate of this invention has resistivity values ranging between $10^2$–$10^6$ ohm.cm after firing. It is considered that for best results, the electrically conducting ceramic component be present in the mixture making up the ceramic filter plate, in a range of 30–70 vol. %. The desired porosity is in excess of 50%, preferably 60%. The mixture is usually made by mixing the fine dry ceramic insulator component with the dry powder of the electrically conductive component and some type of conventional organic binder. The mixture may additionally contain other conventional additives which will enhance the formation of a porous structure and/or improve sinterability. The mixture is subsequently compacted by known methods into a filter plate of any conventional shape or design.

The compacting pressure applied is governed by the particle size range of the ceramic mixture and by the desired porosity of the filter plate obtained, and other conventional considerations.

The ceramic filter plate may also be rendered permeable to gases by other methods, such as for example by introducing a large number of very small apertures in the plate, by means of punching or puncturing, or by other conventional means.

The compacted ceramic filter plate is subsequently fired. The firing temperature depends on the nature of the organic binder, the composition and additives, but is usually in excess of 1200° C.

In one embodiment of the present invention, the perimeter of the filter plate or element will have two opposing sections. In case of a filter plate having a circular perimeter, the opposing sections are understood to mean opposing arc-sections of the circular perimeter of the plate. In case of a rectangular filter plate, the opposing sections are understood to mean opposing sides of the rectangle. The useable portions of the filter plates are considered to be located between the two opposing sections of the filter plate.

In the first embodiment metallic conductors, such as small metal bars are embedded in the ceramic plate close to each of the opposing sections of the perimeter of the compacted plate. The metallic conductors will conveniently have electrical lead wires attached to them, usually subsequent to firing of the ceramic plate, thereby forming what is conventionally understood to be electrodes. The electrodes may be connected by conventional means to a battery or similar electric power source. Thus an electric current may be passed within the ceramic plate located between the two metallic conductors embedded in opposing sections of the perimeter of the ceramic plate.

In another embodiment of the present invention, a conductive metallic layer is deposited by conventional means on each face of the compacted and fired filter plate. Care should be taken that the conductive layers do not block the apertures of the channels within the filter plate, that is the flow of the exhaust gases through the filter is not impeded. An electrode lead, one on each face, is brazed or attached in a similar manner, to the partially coated face of the filter plate. The electrode leads are usually connected to a battery through a switch, whereby electric current may be passed between the faces of the filter plate when this is desired.

Electric current may be passed through the portion of the ceramic plate located between the electrodes, either continuously or intermittently, as is dictated by convenience.

As stated above, the current is designed to heat the ceramic plate to a temperature above 600° C. It is to be noted, that ambient temperature under the present circumstances is considered to be the temperature of the exhaust gases emerging from the engine, which is usually well below 600° C.

The ceramic filter plate equipped with either embedded or plated electrodes, may be fitted with an electrically insulating ceramic frame which encloses the circumference or perimeter of the ceramic filter plate. The frame or suitably shaped insulator element may be made of any suitable non-conducting ceramic material, which may be cast or compacted at the same time as the ceramic filter plate. The insulator element, or ceramic frame, may be fired together with the ceramic filter plate thereby becoming an integral part of the filter plate. Alternatively, the ceramic insulator element may be fired separately and fitted around the filter plate subsequently.

The filter plate, together with the electrode(s) and insulator element fitted around it, is then placed according to conventional methods in a suitable metallic housing. The metallic housing may subsequently be incorporated in the exhaust cleaning system of an internal combustion engine. The exhaust gases emitted by the engine will then be passing through and be filtered by the filter plate of the present invention.

The housing may have a conventional lining designed to protect the filter plate from mechanical damage. Protective lining of this nature is an optional feature of the present exhaust gas filtering device.

In a third embodiment of the exhaust gas cleaning device the ceramic filter plate or ceramic filter element has one electrode deposited on one of the faces only, and an electric lead wire is brazed or connected by conventional means to the deposit. The ceramic filter plate bearing one electrode on one of its faces is subsequently fitted tightly into the metallic housing.

It is to be noted that in the third embodiment no insulating frame is fitted around the filter plate or element and the perimeter of the ceramic filter element is conductively in contact with the metallic housing. The housing is the second electrode in the third embodiment, which is then connected to one terminal of the electric power source or the housing may conveniently be grounded by usual means.

The arrangement whereby only one electrode is connected to the electric power source and the other electrode is grounded, is commonly known as a unipolar arrangement.

In one embodiment shown on FIG. 1(a), the ceramic substance comprising the above described mixture of a ceramic insulator component, an electrically conducting ceramic component and an organic binder, is cast into a rectangular ceramic plate (12). Two metallic bars (14') and (14") are attached to opposing sides of the ceramic rectangle. The bars usually lie along the shorter sides of the rectangle, but they may equally be placed along the longer sides, as long as the sides oppose one another. The metallic bars, referred to as electrodes hereinabove, have electrical leads (16), which can be connected to an electrical power source, conveniently to a battery or a similar power source (not shown). The rectangular ceramic filter plate having electrodes attached to its opposing sides, is fitted into a circular frame (18), made of an insulator ceramic material. The circular frame (18), has a rectangular opening into which the filter plate (12), tightly fits. Alternatively, the circular insulator frame (18), is cast around the rectangular filter plate (12), having electrodes (14') and (14"), on its opposing sides.

Preferably, the circular insulator frame is of the same composition as the insulator ceramic component of the ceramic filter plate; but this is not essential.

The circular ceramic frame embracing the rectangular ceramic filter plate by its four sides, is subsequently fired and sintered at a temperature usually above 1200° C., preferably between 1300°–1400° C. The firing of the assembled ceramic elements will cause the organic binder to burn off, and thus the ceramic assembly will be rendered both porous and hard.

The metallic electrode bars in the above described arrangement need to be resistant to corrosion and oxidation at the temperature of firing. Another method of producing the filter plate of FIG. 1(a), may be to fire the ceramic filter plate and insulating element first and insert the electrodes later, in a conventional manner.

The fired circular plate is then fitted into a housing (20), conveniently made of steel or other suitable metal. The resulting gas filter (10), may then be fitted to the exit end of a pipe carrying the exhaust gases from the combustion chamber of an engine. The electrical leads attached to the electrodes are connected appropriately to a power source.

Figure 1B:
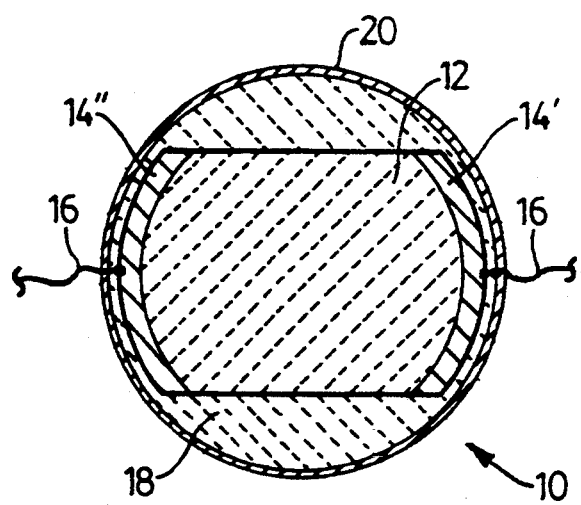

FIG. 1(b) shows a similar exhaust gas filter element arrangement (10), wherein the rectangular filter plate (12), has curved sides and thus electrodes (14') and (14") are also curved. Like numerals represent like elements of the filter element of the present invention.

Figure 2:
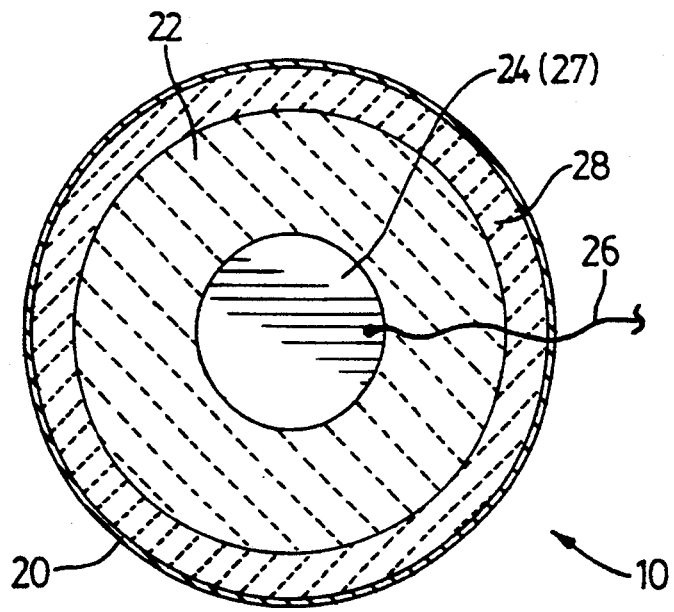

Another variant of the above embodiment of the filter plate of the present invention is shown schematically on FIG. 2. The filter plate of the present invention is made up of the required composition described above, containing electrically conductive and insulator ceramic components. The filter plate is cast into a circular plate or disc (22). The circular ceramic plate is fitted into a ceramic ring (28), which is made of an insulator material. Preferably the ceramic ring (28), is made of the same substance as the insulator component of the circular plate. The circular plate held by the insulator ring is subsequently fired and sintered, and the binder within the mixture is burnt off so as to render the filter plate permeable to gases. The two faces of the fired filter plate (22), are subsequently coated with metallized layers by vaporization, electroless deposition, painting or by any similar conventional means. Electrical lead connections (26), are soldered or brazed to each face (27). FIG. 2 shows only one face (24), and one electrical lead connection (26). It is to be understood that in this embodiment there is a corresponding metallic layer on the underside of the filter plate and a corresponding electrical lead connection. The insulator ring (28) enclosing the circular filter plate (22), is subsequently fitted into a housing (20), and the filter assembly (10), is then attached to the exit end of an exhaust gas carrying pipe.

As discussed above, in the third embodiment of the exhaust gas cleaning device, the ceramic ring 28, as shown on FIG. 2, is omitted. In the third embodiment (not shown) there is no metallic layer deposited on the underside of the ceramic filter element(22).

There may be other conventional ways to have electrode connections incorporated in the ceramic filter element described hereinabove.

Figure 3:
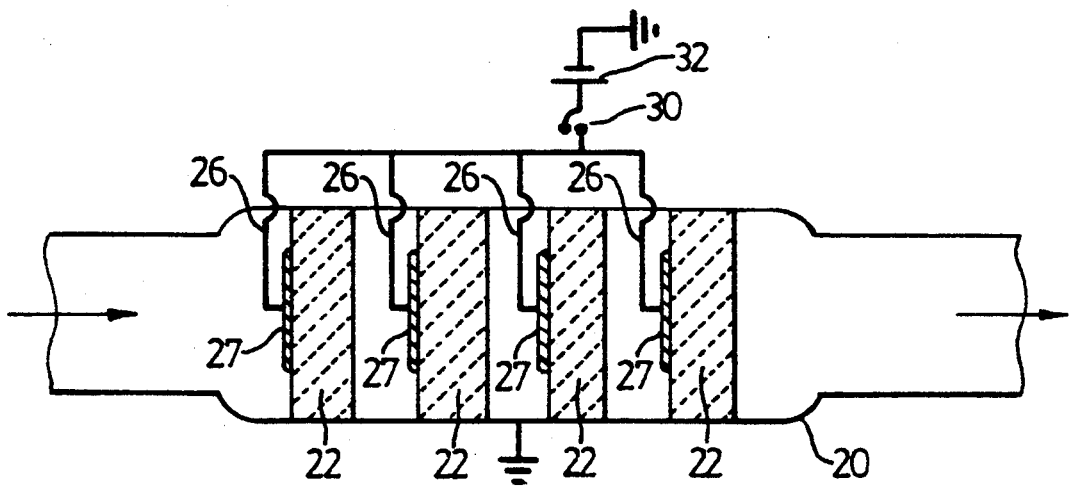
FIG. 3 shows the schematic drawing of the cross-section of an exhaust filtering device housing four porous ceramic filter elements in successive arrangement.

The fourth embodiment of the exhaust filtering device of the present invention is schematically shown in FIG. 3. In the fourth embodiment, four ceramic filter plates(22) each comprising mixtures of electrically conductive and insulating components, which have been fired and have electrical resistivity ranging between $10^2$-$10^6$ ohm.cm, are held in successive arrangement in a metallic housing(20). The perimeter of each filter plate(22) is in contact with the inside of the housing(20). The housing is shown to be grounded. The internal face of each filter plate bears a deposited metallized area(27), which is of a smaller diameter than the internal face of the filter plate(22). An electrical lead wire(26) is brazed to each metallized area(27), and the lead wires of each filter plate are connected through a common lead and a switching mechanism(30), to one terminal of a battery(32). The other terminal of the battery may also be grounded. Arrows indicate schematically the flow path of the exhaust gases proceeding through each successive filter plates.

It is to be noted that the essential function of any filter is to remove solid particles carried by a flowing fluid. In the instance of filtering gases issuing from an internal combustion engine, the fluid is the exhaust gas and the particles are substantially combustible carbon particles. It is a particular advantage of the filter element of the present invention that the particles removed from the gas and trapped in the channels and on the face of the filter element may be eliminated without having to remove or replace the filter. The particles are eliminated by combustion by means of passing an electric current between the electrodes incorporated within the filter, thus raising the temperature of the filter element portion located between the electrodes, sufficiently high to allow particles collected by the filter element to be removed by burning or combustion.

The accumulation of particles which are trapped by the filter, i.e. the build-up of the carbon within and on the surface of the filter element, is a continuous process resulting from the running of the engine. It may take hours, days, or even weeks, before the amount of soot or carbon particles collected, that is before the build-up of combustible particles within the filter element, becomes detrimental. The amount of particles collected by the filter element will depend on the mechanical efficiency and design of the internal combustion engine, the quality and nature of the fuel used, and so on. Thus the frequency and duration of burning and eliminating the trapped carbon particles, or soot, is selected by the user and it is dictated entirely by convenience.

It is the advantage of the ceramic filter element of the present exhaust gas cleaning device that it is capable of trapping the carbon particles carried by the exhaust gases, and subsequently burning the trapped carbon particles. Thus the porous ceramic filter element made according to the present invention is a unitary body acting both as a filtering means and as a heating means. It is a further advantage of the filter element of the present invention, that the combustion of the trapped and accumulated carbon particles is conducted in a controlled manner.

Another advantageous property of the filter element made of the electrically resistive ceramic composition described hereinabove, is that it acquires a relatively high fracture toughness, after the ceramic composition has been fired. The fracture toughness of the fired porous ceramic filter element was found to be in excess of 5 Mpa.m$^{\frac{1}{2}}$.

The high fracture toughness allows the porous ceramic filter element to withstand the vibrations and normal wear and tear an exhaust gas filtering device incorporated with an internal combustion engine, is subjected to.

The exhaust gas cleaning device incorporating the porous ceramic filter element of the present invention has been found to be most adaptable to be used in automotive engines, especially in diesel engines.

The internal combustion device generating exhaust gases may also be stationary, such as a pump. The only requirement is that it has a conduit or pipe through which the combustion gases exit from the combustion chamber. The exhaust gas cleaning device may be attached to the exit end of the conduit and the cleaned exhaust gases then exit to the atmosphere through the outlet port of the housing.

The power source providing the current for generating heat in the filter is conveniently a battery, which is usually incorporated into the working system of the internal combustion engine, or in the device utilizing an internal combustion chamber.

As discussed above, one advantage of the ceramic filter element of this invention is that it removes soot and combustible carbon particles carried by the exhaust gases. Another advantage of utilizing the present ceramic filter element is that it allows the internal combustion engine to operate continuously at the required level of efficiency.

The exhaust gas cleaner incorporating the ceramic filter element described hereinabove may be utilized in conjunction with conventional pressure sensing devices. In using a pressure sensor device the carbon trapped by the filter element may be combusted by allowing the present filter element to act as a heater when the pressure sensor indicates a certain drop in the efficiency of the internal combustion engine.

An alternative arrangement may be that the filter element is incorporated with some kind of a timer device which will trigger the connection to the power source providing the current passing through the filter element. There are known timing devices to establish such periodic contact.

In yet another application of the filter element design of the present invention, the efficiency of an engine may be monitored by measuring the frequency and the current requirement for eliminating the build-up of accumulated carbon particles during the performance of the engine.

The following examples will illustrate the making and the utilization of the ceramic filter of the present invention.

EXAMPLE 1

Fine particles of silicon nitride were mixed with molybdenum disilicide in a volume ratio of 60:40. The average particle size of the mixture was 20μm. The organic binder utilized in this example is marketed under the trade name of Durez (marketed by Canadian Occidental Petroleum Ltd.). An aqueous slurry was made with the organic binder by mixing it with sufficient amount of water to render it pourable. The organic binder slurry was then added to the dry ceramic mixture in 50 vol. %. Discs having dimensions of 4" diameter and 1" thickness were cast from the above mixture.

A separate mixture made of silicon nitride particles and aqueous organic binder slurry in 25 vol. % was prepared. A ring of 1" thickness, 4" internal diameter and 4.25" external diameter was cast from the latter mixture.

The green discs made of silicon nitride and molybdenum disilicide were inserted into the green ceramic rings composed essentially of silicon nitride.

The green discs enclosed by the rings were allowed to dry in air, and subsequently they were fired in air applying slow heating to attain 700° C. The temperature was raised gradually to 700° C. in a period of 12 hours. Subsequently the temperature was further increased and the firing was continued in argon atmosphere at 1600° C. for another two hours. The filter discs so obtained were found to have 62 vol. % porosity. The surrounding ring made of non-conducting ceramic material was found to have less than 20% porosity.

A layer of copper was deposited on the flat faces of the disc by electroless deposition. The deposits were located in the centre of the flat face and had approximately 1 inch diameter. Care was taken that no copper was deposited over the surface of the insulator ring enclosing the ceramic filter discs.

Insulated copper wire was brazed, one to each side to the copper layer deposited on the face of the filter disc.

The filter discs so obtained and enclosed in an insulator ring were subsequently encased in a stainless steel cylinders, which allowed them to be fitted to the exhaust pipe of an internal combustion engine.

EXAMPLE 2

An exhaust gas filter made as described in Example 1, was incorporated into the exhaust system of a medium speed diesel engine. The electrodes located on each side of the gas filter were connected to the battery of the diesel engine, which in the present case was a 12 volt battery having an output of 50 amps. Thus the power of about 0.60 Kw was applied to the filter plate after the engine had been running for 10 hours. Within 3 minutes of applying 0.60 Kw power, the black soot which was observed to have deposited on the filter after 10 hours of running, has been completely burned off and the engine has been restored to its previous efficiency.

It can thus be seen that the ceramic filter plate made in accordance with the present invention is not only efficient in removing carbon particles from the exhaust gas of the diesel engine, but also efficient in eliminating the accumulated carbon particles without having the resort to removal of the ceramic filter plate for cleaning and thus restoring the performance of the engine.

Although the present invention has been described with reference to the preferred embodiments, it is to be understood that modifications and variations may be resorted to without departing from the spirit and scope of the invention, as those skilled in the art will readily understand. Such modifications and variations are considered to be within the purview and scope of the invention and the appended claims.

I claim:

1. An exhaust gas filtering device comprising,
   i) a porous ceramic filter element having interconnecting channels for allowing exhaust gases to flow therethrough and trapping particles carried by said exhaust gases, said porous ceramic filter element being a unitary body composed of an electrically resistive ceramic substance comprising an electrically conducting ceramic component selected from the group consisting of molybdenum disilicide, titanium nitride, titanium carbonitride, titanium boride and zirconium boride, said electrically conducting ceramic component being homogenously dispersed in an electrically insulating ceramic component selected from the group consisting of silicon nitride, zirconia, alumina, cordierite, an alumina-silicate bearing chemical composition and mixtures thereof, said unitary body having uniform electrical conductivity, said unitary body of said porous ceramic filter element being defined by internal and external faces and a perimeter;
   ii) a pair of electrodes in contact with said porous ceramic filter element, each of said electrodes having means to connect it to an electrical power source for generating an electrical current flowing between said pair of electrodes and within said porous ceramic filter element, thereby providing means to heat said porous ceramic filter element to a temperature above the ambient; and
   iii) a housing having means to enclose the perimeter of said porous ceramic filter element, said housing having an inlet port in communication with an engine combustion chamber, and an outlet port, thereby facilitating the passage of exhaust gases from said combustion chamber through said internal face of said porous ceramic filter element to said outlet port.

2. An exhaust gas filtering device according to claim 1, wherein said electrically conducting ceramic component is present in said electrically resistive ceramic substance in 30–70 vol. %.

3. An exhaust gas filtering device according to claim 1, wherein said electrically resistive ceramic substance additionally comprises sintering additives.

4. An exhaust gas filtering device according to claim 1, wherein said interconnecting channels of said porous ceramic filter element have apertures ranging between 1 µm and 500 µm diameter.

5. An exhaust gas filtering device according to claim 1, wherein one of said pair of electrodes is a metallic coating deposited on one of said faces of said porous ceramic filter element and said metallic coating has a brazed metallic lead means for connecting said metallic coating to said electrical power source.

6. An exhaust gas filtering device according to claim 5, wherein the other of said pair of electrodes in contact with said porous ceramic filter element comprises said housing, and said housing has means for connecting said housing to said electrical power source or to ground.

7. An exhaust gas filtering device according to claim 1, wherein said electrodes are metallic bars embedded along the perimeter of said porous ceramic filter element in opposing sections of said perimeter and each of said bars has an attached metallic lead means to connect said bar to said electrical power source.

8. An exhaust gas filtering device according to claim 7, wherein the perimeter of said porous ceramic filter element is congruously enclosed in an annular insulator ring having an insulator ring perimeter and lower porosity than said porous ceramic filter element, and said housing has means to enclose said insulator ring perimeter.

9. An exhaust gas filtering device according to claim 7, wherein said perimeter of said ceramic filter element is congruously enclosed in an insulator plate having a circular insulator plate perimeter and lower porosity than said porous ceramic filter element, and said housing has means to enclose said circular insulator plate perimeter.

10. An exhaust gas filtering device according to claim 1, wherein said housing further comprises means to protect said porous ceramic filter element from mechanical shock.

11. An exhaust gas filtering device according to claim 1, wherein said housing is located within the exhaust gas handling system of an internal combustion device.

12. An exhaust gas filtering device according to claim 11, wherein said internal combustion device is an automotive engine.

13. An exhaust gas filtering device comprising a plurality of porous ceramic filter elements, each porous ceramic filter element having interconnecting channels for allowing exhaust gases to flow therethrough and trapping particles carried by said exhaust gases, said porous ceramic filter element being a unitary body composed of an electrically resistive ceramic substance further comprising an electrically conducting ceramic component selected from the group consisting of molybdenum disilicide, titanium nitride, titanium carbonitride, titanium boride and zirconium boride, said electrically conducting ceramic component being homogenously dispersed in an electrically insulating ceramic component selected from the group consisting of silicon nitride, zirconia, alumina, cordierite, an alumina-silicate bearing chemical composition and mixtures thereof, said unitary body having uniform electrical conductivity, said unitary body of said porous ceramic filter element being defined by an internal face, an external face and a perimeter, each porous ceramic filter element having a pair of electrodes in contact with said porous ceramic filter element, each of said electrodes having means to connect it to an electrical power source for generating an electrical current flowing between said electrodes and within said porous ceramic filter element, thereby providing means to heat said porous ceramic filter element to a temperature above the ambient; and a housing having means to enclose the perimeter of each of said plurality of said porous ceramic filter elements in succession such that the external face of each but the last of said plurality of said porous ceramic filter elements, opposes the internal face of a successive porous ceramic filter element, said housing having an inlet port in communication with an engine combustion chamber and an outlet port, thereby facilitating the passage of exhaust gases from said chamber to the internal face of the first of said plurality of said porous ceramic filter elements, subsequently through each porous ceramic filter element to said outlet port.

14. An exhaust gas filtering device according to claim 13, wherein one of each of said pair of electrodes in contact with each of said plurality of said porous ceramic filter elements comprises a metallic coating deposited on one of said faces of said porous ceramic filter element, said metallic coating having metallic lead means to connect said metallic coating to an electrical power source, and the other of said pair of electrodes comprises said housing enclosing the perimeter of said porous ceramic filter element, and said housing has means to connect said housing to said electrical power source or to ground.

* * * * *